US010101925B2

United States Patent
Stephens et al.

(10) Patent No.: US 10,101,925 B2
(45) Date of Patent: Oct. 16, 2018

(54) DATA INVALIDATION ACCELERATION THROUGH APPROXIMATION OF VALID DATA COUNTS

(71) Applicant: Toshiba Memory Corporation, Minato-ku, Tokyo (JP)

(72) Inventors: Matthew Stephens, Cumbria (GB); Julien Margetts, Thame (GB)

(73) Assignee: Toshiba Memory Corporation, Tokyo (JP)

( * ) Notice: Subject to any disclaimer, the term of this patent is extended or adjusted under 35 U.S.C. 154(b) by 175 days.

(21) Appl. No.: 14/757,458

(22) Filed: Dec. 23, 2015

(65) Prior Publication Data
US 2017/0185322 A1    Jun. 29, 2017

(51) Int. Cl.
  G06F 3/06        (2006.01)
  G06F 12/12       (2016.01)
  G06F 12/128      (2016.01)

(52) U.S. Cl.
  CPC .......... *G06F 3/0619* (2013.01); *G06F 3/0659* (2013.01); *G06F 3/0679* (2013.01); *G06F 3/0688* (2013.01); *G06F 12/128* (2013.01); *G06F 12/12* (2013.01)

(58) Field of Classification Search
  CPC ... G06F 3/0659; G06F 12/128; G06F 2212/69
  See application file for complete search history.

(56) References Cited

U.S. PATENT DOCUMENTS

| | | | | |
|---|---|---|---|---|
| 5,524,230 A * | 6/1996 | Sakaue | ................. | G06F 3/0601 711/103 |
| 5,699,549 A * | 12/1997 | Cho | .................... | G06Q 20/341 235/492 |
| 2009/0089483 A1* | 4/2009 | Tanaka | ................. | G06F 3/0608 711/103 |
| 2009/0100231 A1* | 4/2009 | Okabayashi | ........ | G06F 12/0802 711/137 |
| 2009/0292880 A1* | 11/2009 | Usui | ................... | G06F 12/0846 711/128 |
| 2010/0115188 A1* | 5/2010 | Lee | ..................... | G06F 12/0246 711/103 |
| 2010/0180145 A1* | 7/2010 | Chu | .................... | G06F 12/0246 714/2 |
| 2011/0202812 A1* | 8/2011 | Asano | ................. | G06F 11/1068 714/747 |
| 2013/0219106 A1* | 8/2013 | Vogan | ................. | G06F 12/0246 711/103 |
| 2013/0275660 A1* | 10/2013 | Bennett | ............... | G06F 12/0292 711/103 |

(Continued)

Primary Examiner — Midys Rojas
Assistant Examiner — Khoa D Doan
(74) Attorney, Agent, or Firm — White & Case LLP

(57) ABSTRACT

A memory controller implemented within a non-volatile data storage device with improved efficiency for executing data invalidation commands is disclosed. In one embodiment, the non-volatile data storage device in communication with a host device and comprises a processor, a memory device that includes a plurality of physical storage locations, a cache memory configured to store a map table and a count value. The controller is configured to receive a data invalidation request from the host device where the request includes an execution parameter. Based on the execution parameter, the controller executes the invalidation request in an efficient and flexible manner.

26 Claims, 15 Drawing Sheets

(56) References Cited

U.S. PATENT DOCUMENTS

| | | | | |
|---|---|---|---|---|
| 2014/0115293 A1* | 4/2014 | Taylor | ............... | G06F 12/023 |
| | | | | 711/170 |
| 2014/0258587 A1* | 9/2014 | Baryudin | ............ | G06F 12/0246 |
| | | | | 711/102 |
| 2014/0304487 A1* | 10/2014 | Hayasaka | ............. | G06F 13/385 |
| | | | | 711/202 |
| 2015/0006793 A1* | 1/2015 | Shin | ............... | G06F 3/0641 |
| | | | | 711/103 |
| 2015/0193346 A1* | 7/2015 | Yamamura | .......... | G06F 12/0833 |
| | | | | 711/144 |
| 2016/0371195 A1* | 12/2016 | Kim | ............... | G06F 12/0653 |
| 2017/0102884 A1* | 4/2017 | Kim | ............... | G06F 3/0608 |
| 2017/0147502 A1* | 5/2017 | Byun | ............... | G06F 12/1009 |

\* cited by examiner

DATA INVALIDATION ACCELERATION THROUGH APPROXIMATION OF VALID DATA COUNTS

FIELD OF THE INVENTION

The present invention relates to solid state storage devices, and more particularly, to an improved solid state storage device for improved execution of data invalidation commands, such as TRIM or UNMAP.

BACKGROUND OF THE INVENTION

Solid-state drives ("SSDs") are one example of a storage device that stores data in non-volatile memory, such as NAND flash memory (commonly referred to as just "flash memory"). Flash memory stores information in an array of floating-gate transistors or cells. These transistors are organized into pages, and the pages are organized into memory blocks. A block may comprise a certain number of pages, and each page may comprise a certain amount of data. As one example, there may be 64 pages in one block, and 4 KB of data in each page. These numbers may vary based on the manufacturer of the SSD.

The technical nature of flash memory imposes several operational requirements. For example, the page can be the smallest unit of the memory in which data may be programmed (i.e., either written to or read from), and the block can be the smallest unit in which data may be erased. Data can only be written to empty pages. Therefore, writing new data to a page already storing data (e.g., invalid data) first requires erasing the invalid data.

However, because data within flash memory is erased on a per-block basis, it is not possible to overwrite data on a per-page basis. From an operational standpoint, a block should first be erased before any of its pages are reused to store any new data.

Additionally, an SSD containing flash memory does not provide full access to the physical flash memory locations. Instead, communicating with flash memory requires use of a storage interface that is presented to an external application (e.g., an operating system in a host). Communicating with the interface requires use of logical addresses that are then translated into physical addresses corresponding to physical locations in the flash memory.

This level of indirection creates an interesting scenario during deletion operations. When an operating system removes a file, the operating system does not actually remove the data corresponding to the file from the flash memory. Instead, the operating system simply removes the logical address(es) associated with the deleted file but leaves intact anything that corresponds to the physical location(s) where the data is (still) currently stored in the flash memory. Therefore, while the operating system believes the file to be deleted, the data for that file still exists in the flash memory. The flash memory is not aware that operating system has deleted the file, and is not aware that the data stored in its blocks are no longer valid.

When an operating system attempts to write new data to an occupied physical location(s) that it believes is available (e.g., at the location of the deleted file), the new data is actually written to a different empty physical location in flash memory. The operating system's attempt to write the new data to the occupied physical location signals the flash memory that the actual data located at that location is no longer in use. In other words, the flash memory typically only becomes aware of invalid data located at a physical location when the operating system attempts to write new data to that particular physical location. At this point, the flash memory may then invalidate the data at that physical location.

To address these issues, one command that is typically employed with storage systems that employ flash memory is a data invalidation command. A data invalidation command acts as a signal from the operating system that a range of logical addresses are no longer needed because the file associated with that range has been deleted by the operating system. The flash memory therefore does not need to wait until the operating system attempts to write new data but may preemptively invalidate the data.

The operating system sends the data invalidation command to the flash memory when the operating system deletes a file(s). Based on the data invalidation command, the flash memory is notified as to which pages are now storing invalid data and that do not need to be included when the flash memory next performs garbage collection. Garbage collection refers to the process where flash memory periodically performs maintenance on its blocks by consolidating valid data pages into new blocks. Therefore, the purpose of the data invalidation command is to make the process of updating the flash memory with new data more efficient.

However, the time to execute a data invalidation command can take an extensive amount of time, especially for when data invalidation commands impact a large number of physical addresses. As part of the execution of the data invalidation command, the flash memory must also perform other processes and steps. The amount of time to perform these other processes and steps increases as the number of impacted addresses increases.

As the storage capacity of flash-based memory devices increases, the increased number of blocks that are impacted by a data invalidation command will burden conventional controllers for these higher capacity memory devices. Therefore, the length of time for executing data invalidation commands will only increase as storage capacity increases.

As can be seen, conventional SSDs are rigidly implemented because their controllers cannot adjust the execution of data invalidation commands. There is a long felt need for an improved storage device that executes the data invalidation command in a more efficient and flexible manner.

SUMMARY

The present invention describes an improved storage device and method for executing data invalidation commands within a storage system. According to one embodiment of the invention, a non-volatile data storage device includes a memory device having physical storage locations and a cache memory configured to store a count value for each of the physical storage locations of the memory device. The map table further comprises having a plurality of entries associated with an address range $A_1$ to $A_x$ where a value of x represents the size of the address range and is greater than or equal to 1. The controller further includes a controller configured to be responsive to a data invalidation request received from a host device by invalidating the plurality of entries associated with the address range $A_1$ to $A_x$, and decrementing a count value for a number of entries in the plurality of entries, where the number of entries is less than the value of x.

According to another embodiment of the invention, a method for executing a data invalidation command by a storage device includes the step of receiving a data invalidation request and responsive to the data invalidation request, invalidating a plurality of entries in a map table based on the address range $A_1$ to $A_x$. The value of x represents the size of the address range and is greater than or equal to 1. The method further comprises decrementing a count value for a number of entries of the plurality of entries where the number of entries is less than the value of x.

DETAILED DESCRIPTION OF THE INVENTION

An improved non-volatile memory system, such as solid-state drives (SSDs), with more efficient performance when executing data invalidation commands will now be described with reference to the accompanying drawings. In storage systems employing the Advanced Technology Attachment ("ATA") interface standard, the data invalidation command is entitled "TRIM." In storage systems employing the Small Computer System Interface ("SCSI") standard, the data invalidation command is entitled "UNMAP."

In describing various embodiments, specific terminology is employed for the sake of clarity. However, the disclosure is not intended to be limited to the specific terminology used in this specification. It is to be understood that each specific element includes all technical equivalents, which operate in a similar manner to accomplish a similar purpose.

Figure 1:
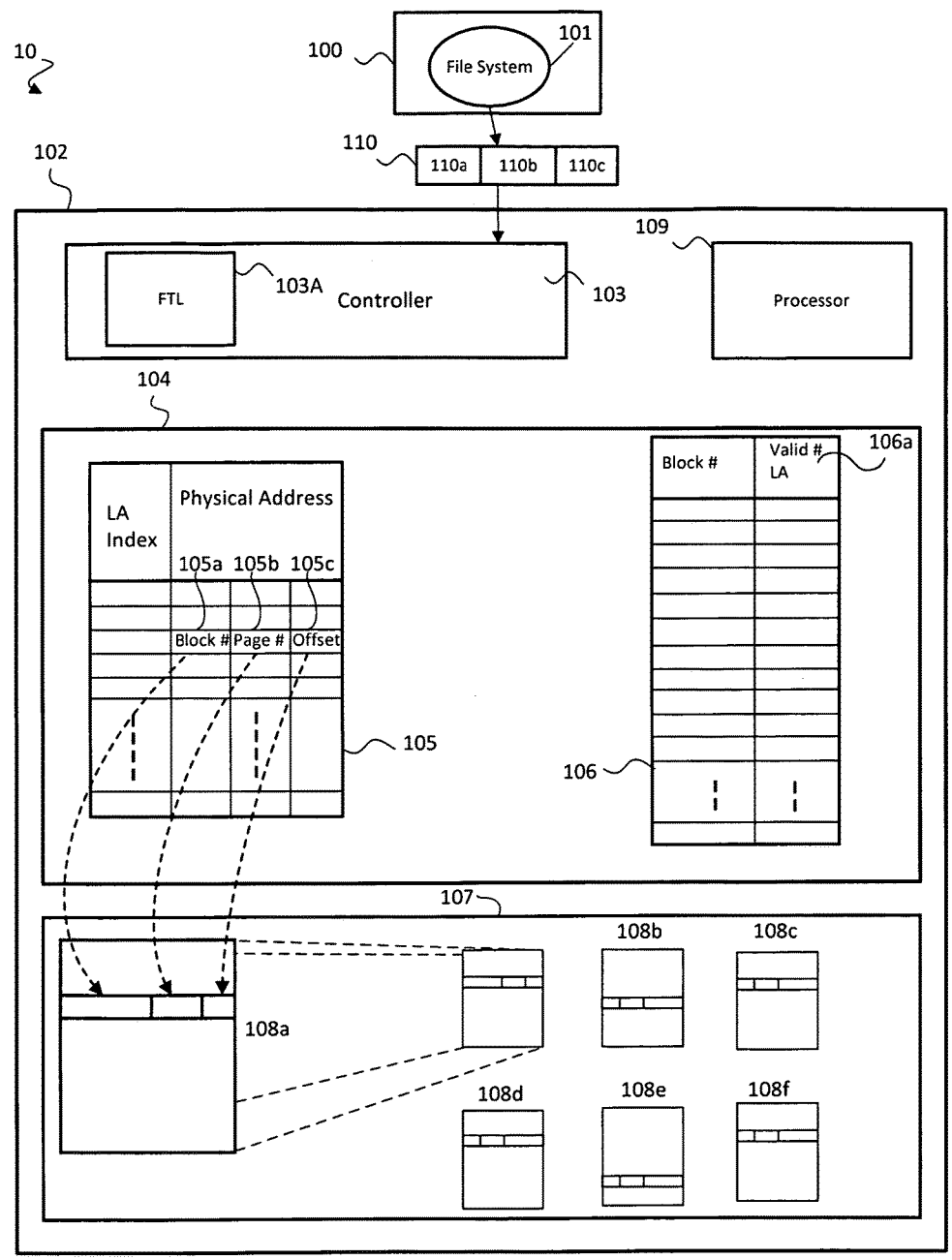
FIG. 1 illustrates a storage system according to an exemplary embodiment of the present disclosure.

FIG. 1 shows a block diagram of a storage system 10 according to an exemplary embodiment of the present disclosure. Storage system 10 includes an operating system 100 implementing a file system 101. One example of a file system 101 is a file allocation table (FAT) file system. The operating system 100 and file system 101 are connected to a non-volatile storage device 102, which may be implemented as a flash-based SSD. Storage device 102 comprises a controller 103 that implements a flash translation layer ("FTL") 103A, dynamic random access memory ("DRAM") 104, storage media 107, and a processor 109. The controller 103 may be implemented as an embedded microchip. Storage media 107 may be implemented as flash memory.

FTL 103A is a translation layer functions as an interface between the file system 101 and the storage media 107, and exposes logical addresses of the storage media 107 to the file system 101. In this way, the controller 103 acts as an intermediary between the file system 101, which utilizes logical addresses, and storage media 107, which utilizes physical addresses.

Controller 103 receives requests and commands from the file system 101 and performs address translation in executing the requests and commands. Command 110 is one example of a command that is implemented as a data invalidation command. Command 110 comprises at least one parameter that specifies a number of logical block addresses that are impacted by the command 110. In one embodiment, command 110 comprises a logical address 110a and a length parameter 110b. The logical address 110a and length parameter 110b are propagated to the interface for the storage media 107 for processing. Data invalidation command 110 may optionally include an execution parameter 110c. As with the logical address 110a and length parameter 110b, this execution parameter 110c may also be propagated to the interface for the storage media 107 for processing. In another embodiment, command 110 may comprise a single parameter that specifies the range of logical block addresses that are impacted by the command 110.

The controller's 103 address translation function employs a lookup table 105 stored in DRAM 104 to perform translation between logical addresses from the file system 101 space and physical addresses in the storage media 107. The lookup table 105 uses logical addresses as indices to locate physical addresses in the lookup table 105.

Logical addresses refer to logical block addresses ("LBAs"), slices, or both. Slices comprise a certain number of LBAs. An LBA refers to a block of data of a fixed size, e.g., 512 bytes or 4K bytes. A slice refers to a set of LBAs and may be 4K bytes plus additional bytes for headers, metadata, and parity bits. In an embodiment where an LBA refers to a block of data that is 512 bytes, there are eight LBAs per slice. Embodiments of the invention that implement logical addresses as LBAs only are discussed in further detail in FIGS. 3 and 4A-4C. Embodiments of the invention that implement logical addresses to include slices is discussed in further detail in FIGS. 5-8, 9A-9C, and 10. Other implementations of the logical addresses are possible and are within the scope of the invention.

Physical addresses may refer to either the blocks or pages of the storage media 107. In this embodiment, a physical address comprises a block number 105a, a page number 105b, and an offset 105c. The block number 105a indicates the block in which the data is stored, the page number 105b indicates the page within the block in which the data is stored, and the offset 105c indicates the location within the page in which the data is stored.

The controller 103 converts logical addresses as used by the file system 101 to physical addresses as used by the storage media 107 via the mapping provided by the lookup table 105. Also stored in the DRAM 104 is a block metadata table 106 that tracks the number of valid logical addresses for each block of the storage media 107 using a count value 106a. Storage media 107 may comprise multiple blocks 108a-108f. The number of blocks shown is merely for ease of illustration and one of ordinary skill in the art would understand that storage media 107 may comprise any number of blocks.

Figure 2:
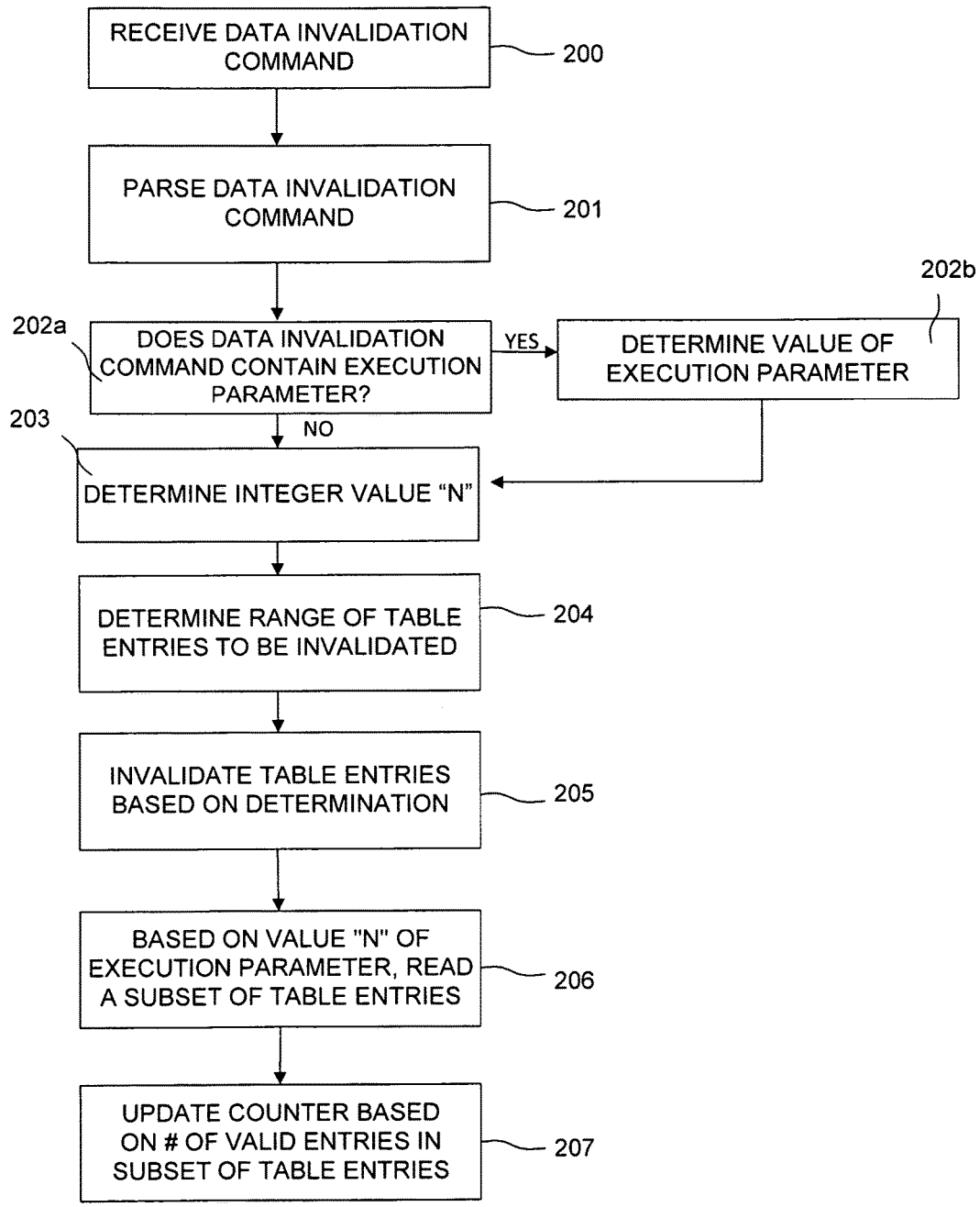
FIG. 2 is a flow diagram illustrating the steps performed by a controller according to one embodiment of the present disclosure.

FIG. 2 shows a flow diagram of the steps performed by the controller 103 according to one embodiment of the present disclosure. In step 200, the controller 103 receives a data invalidation command 110 (e.g., a TRIM command) from the file system 101. The file system 101 generally sends the command 110 upon deletion of a file(s). In step 201, the controller 103 parses the command 110, which may contain command parameters that influence the controller 103's execution of the command 110. Command parameters may be addresses parameters 110a and 110b. Address parameters 110a and 110b indicate a range (or ranges) of logical addresses to be invalidated in the lookup table 105. For example, one address parameter 110a may specify a logical address and a second address parameter 110b indicates the range of addresses by specifying a span or length of addresses starting from the logical address. These address parameters 110a and 110b indicate the range of logical addresses corresponding to the file(s) deleted by the file system 101. An optional command parameter is execution parameter 110c and, if included in the data invalidation command 110, may be used by the controller 103 during execution.

In step 202a, the controller 103 determines whether the data invalidation command 110 includes the execution parameter 110c. If so, the controller 103 determines the value of the execution parameter 110c in step 202b. The controller may then determine the integer value N based on the value of the execution parameter 110c. In one embodiment, the execution parameter 110c directly specifies a specific integer value N. In subsequent steps, e.g., when updating the count value 106a, the controller 103 uses the integer value N to parse the lookup table 105 by reading every Nth entry in the lookup table 105 for the given range of logical addresses indicated by the address parameters 110a and 110b. For example, if the execution parameter 110c specifies "1," the controller 103 accesses every entry in the lookup table 105 for the given range of logical addresses, and decrements the count value 106a in the block metadata table 106 for each accessed entry by one. On the other hand, if the execution parameter 110c specifies "2," the controller 103 accesses every $2^{nd}$ entry in the lookup table 105 and decrements the count value 106a for each accessed entry by two. In this embodiment, because the controller 103 only accesses a subset of the entries (e.g., every $2^{nd}$ entry) in the block metadata table 106 for a given range instead of every entry, execution time of the data invalidation command 110 is improved. Of course, as the integer value N increases, the time for executing the data invalidation command 110 similarly decreases because the subset of entries read by the controller 103, and therefore the number of updates to count value 106a decreases.

The trade-off for improved execution time is an approximation by averaging of the count value 106a. This is achieved by instead of decrementing each count value 106a by one, every Nth value in decremented by the integer value N. In either case, the count values for a set of N values will be decremented by N overall, such that the total amount decremented will still be N. However, the impact of an approximated count value 106a is relatively limited because the count value 106a is used as an indicator to select a block in memory device 107 for garbage collection and because the count value 106a corrects itself over time. The effect of an approximated count value 106a on garbage collection is merely that a block may be selected earlier or later than when the count value 106a is calculated exactly.

But even the effect on garbage collection is mitigated because the count value 106a is updated in the background by the controller 103 when executing other operations for the file system 101. For example, during write operations, the controller 103 will rewrite recently deleted pages with new data and will update the count value 106a accordingly. Additionally, the controller 103 will also update the count value 106a for updated blocks when performing periodic garbage collection. Therefore, through these other processes, the count value 106a will be continuously updated and become accurate again.

Referring back to step 202b, in another embodiment, the execution parameter 110c specifies a time duration in which the execution of the command is to be completed. In step 203, the controller 103 then calculates the value N based on the specified time duration. Any formula or calculation may be used to calculate the value of N. Different variables may be factored into this calculation including the requested time of completion, the number of logical addresses affected by the data invalidation command, and the speed of the controller 103.

If, on the other hand, the data invalidation command 110 does not include execution parameter 110c, the controller 103 proceeds directly to step 203 and calculates the integer value N based only on the logical address 110a and length parameter 110b. Any method for calculating for the integer value N may be used. Length parameter 110b describes the size or length of the range of LBA addresses that are impacted by the data invalidation command 110. Therefore, in one method, the controller 103 may directly calculate the integer value N based on the number of blocks or LBA addresses that are impacted by the data invalidation command 110.

In another method, the controller 103 calculates the integer value N based on where the length parameter 110b falls within a total range of values, which is partitioned into a plurality of bands. One way it may do this is by using a plurality of threshold values to set upper and lower values defining each band within the total range of values. The controller 103 then selects an integer value N according to the band in which the value of the length parameter 110b falls. For example, the controller may specify that the value of integer N is given a first value if the value of length parameter 110b falls between 1 and 100 LBA addresses (i.e., a first band), a second value if the value falls between 101 and 1000 LBA addresses (i.e., a second band), and a third value if the value is above 1001 LBA addresses (i.e., a third band). The bands may be predefined by the controller 103 prior to receiving the data invalidation command 110, or may be dynamically calculated by the controller 103 upon receiving the data invalidation command 110.

In a further embodiment, after first calculating the integer value N based on the value of the execution parameter 110c (i.e., step 202b) as discussed above, step 203 may further include the controller 103 dynamically adjusting the integer value N based on predetermined criteria of the storage system 10. For example, the controller 103 may adjust the integer value N based on the number of blocks that will be impacted by the data invalidation command 110 or based on a current usage of the processor 109 of the storage device 102. In this manner, the controller 103 of the present disclosure dynamically controls the execution of the data invalidation command 110. In one example, if the number of blocks that will be impacted is over a certain threshold, the controller 103 can dynamically increase the integer value N that was determined based on the value of the execution parameter 110c (i.e., step 202b) to decrease the execution time of the data invalidation command 110. After adjusting the integer value N, the controller 103 may proceed with execution of the data invalidation command 110. Conversely, if the number of affected blocks is under a certain threshold, the controller 103 can dynamically decrease the integer value N.

In step 204, the controller 103 determines the range of entries in the lookup table 105. Step 204 may be performed by the FTL 103A by looking at the logical address 110a and length parameter 110b included in the data invalidation command 110. As noted above, FTL 103A utilizes a lookup table 105 to translate logical addresses (as viewed by the file system 101) into physical addresses (as viewed by the storage media 107).

In step 205, the controller 103 accesses the lookup table 105 and invalidates the range of entries in the lookup table 105. Invalidating entries in the table 105 means that zeros are returned for the range of entries, by for example, setting the values to NULL. This serves as an indication to the controller 103 that the range of entries no longer contains valid data. The update to the lookup table 105 is efficient because the entries are sequentially stored for the length of the range of entries.

In step 206, the controller 103 accesses the entries in block metadata table 106 based on the block number 105a, where the number of accessed entries is based on the integer value N as determined in step 203. As noted above, if the integer value N is greater than 1, the controller 103 will access a subset of the entries within the range of entries, as determined in step 204, to update the value of the count value 106a for each of the accessed entries. The value of the count value 106a indicates the number of logical addresses within the block that have valid data (i.e., that have not been invalidated as part of a data invalidation command). Finally, in step 207, the controller 103 updates the count value 106a in DRAM 104 with the number of logical addresses that have valid data for each of the accessed blocks as determined in step 206.

FIGS. 3 and 4A-4C, which are discussed below, describe the hardware implementation of one embodiment of the present disclosure. The discussed embodiment is for exemplary purposes to illustrate the implementation of the controller 103 of the present disclosure and is simplified for ease of illustration, and is not intended to limit the scope of the present disclosure.

Figure 3:
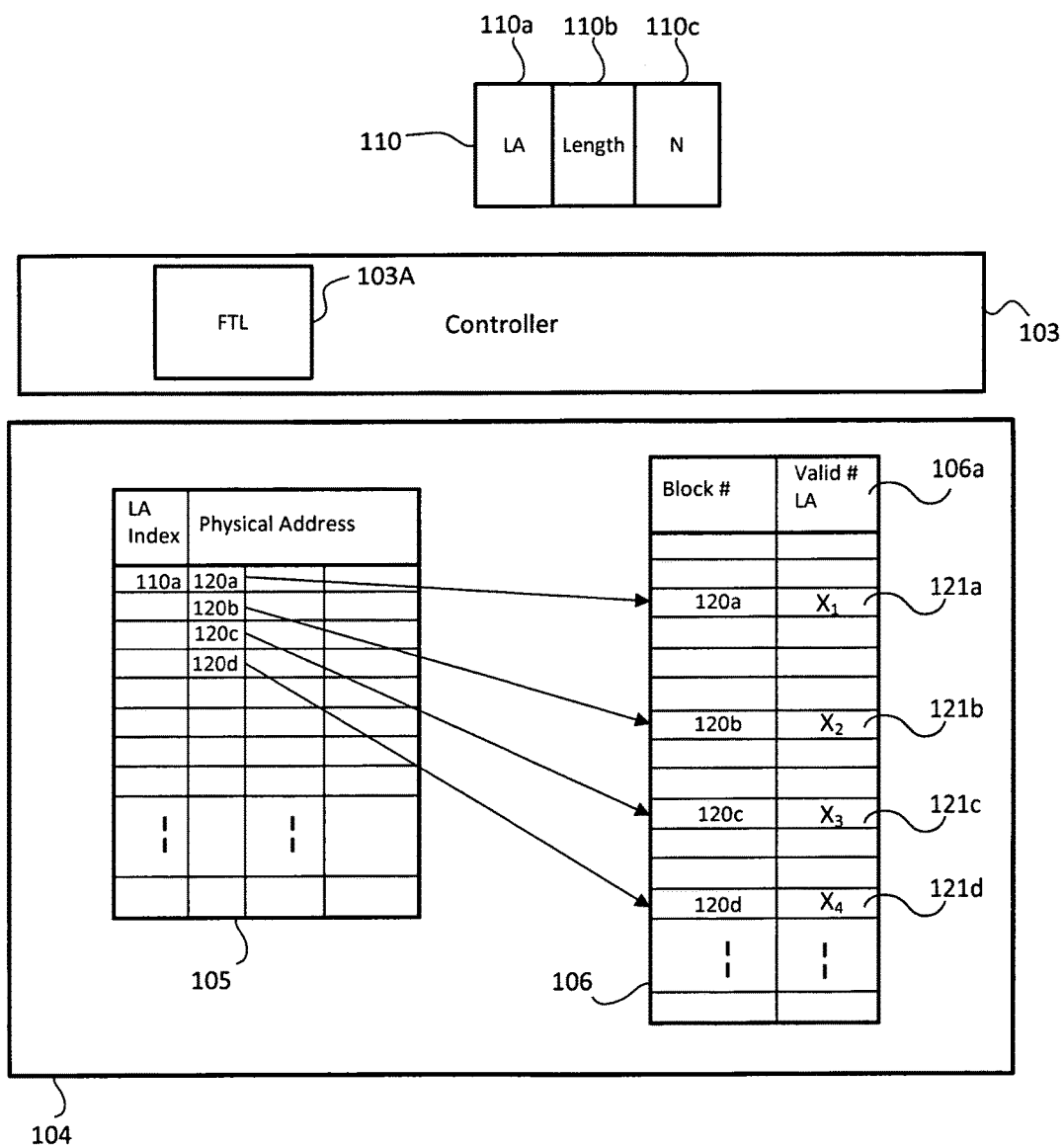
FIG. 3 illustrates a storage device according to one embodiment of the present disclosure.

FIG. 3 represents an embodiment of the present invention prior to execution of a data invalidation command by a controller 103 of the present disclosure. For ease of illustration, only certain elements of the storage system 10 are shown. In this embodiment, the data invalidation command is a TRIM command 110, which comprises a logical address 110a, a length parameter 110b, and an execution parameter 110c whose value may be represented by the variable N. The logical address 110a acts as an index for lookup table 105. The length parameter 110b represents a range of addresses within the lookup table 105 by specifying a certain number of logical addresses that are included in the range starting from the logical address 110a. For example, a logical address 110a and a length parameter 110b that specifies "3" indicates that the address range includes address 110a along with the three subsequent addresses following address 110a in the lookup table 105. Therefore, the TRIM command 110 affects data stored in a range starting from logical address 110a and spanning additional logical addresses as specified by the length parameter 110b in the lookup table 105. Other implementations for indicating the range of addresses impacted by the TRIM command 110 are within the scope of the invention.

The controller 103 utilizes LBA 110a as an index into the lookup table. The controller 103 then utilizes the length parameter 110b to identify the respective block numbers 120a-120d corresponding to the range of logical addresses indicated by the TRIM command 110. The block numbers 120a-120d are indexes for the block metadata table 106. Associated with each block number 120a-120d is a count value 106a. The count value 106a tracks the number of valid logical addresses within each block corresponding to the block number 120a-120d. For example, the values $X_1$-$X_4$ stored in the count value 106a indicate the number of logical addresses in each block 120a-120d that contain valid data.

Figure 4A:
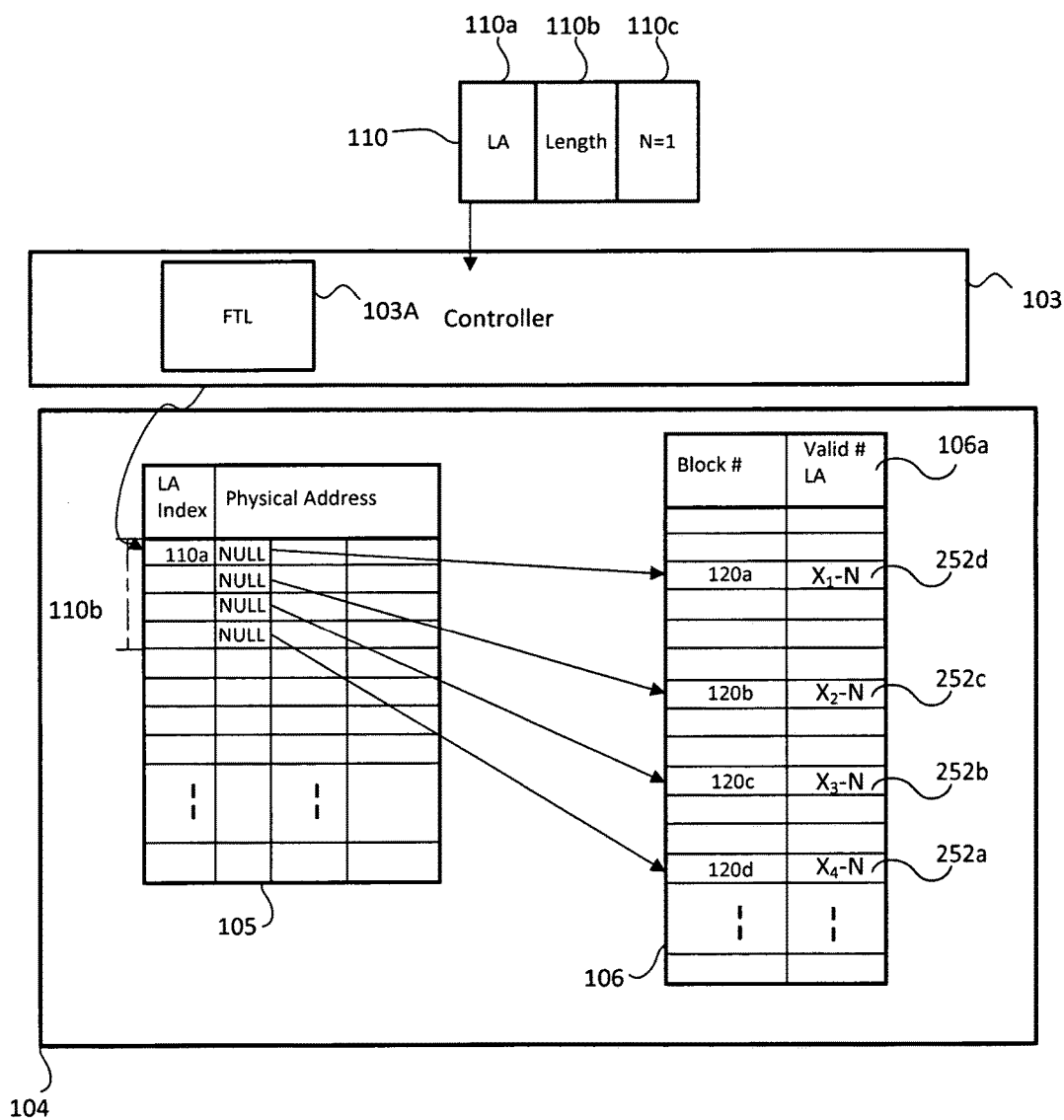
FIGS. 4A-4C illustrates a storage device during execution of a data invalidation command with different parameters according to one embodiment of the present disclosure.
Figure 4B:
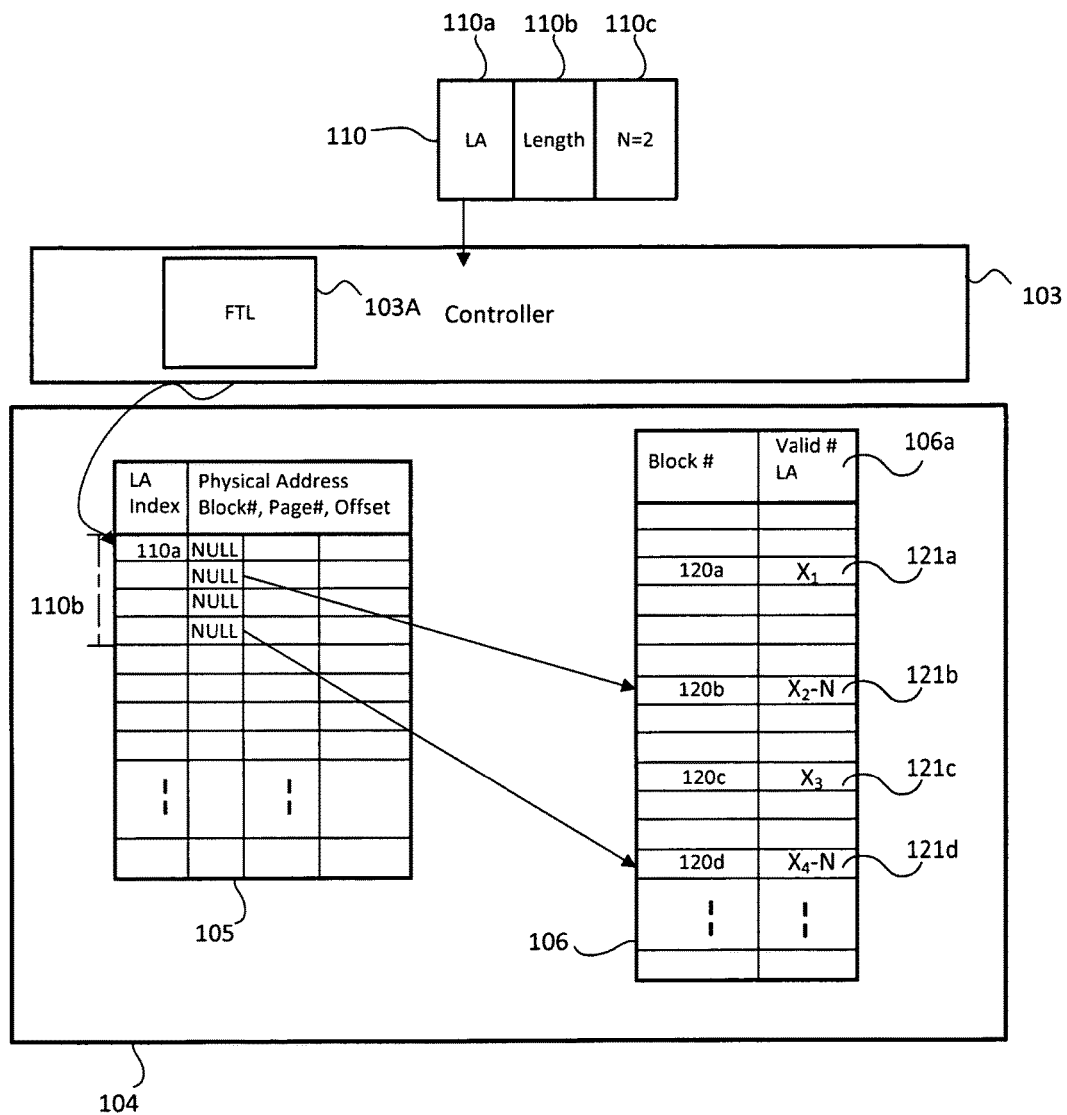
Figure 4C:
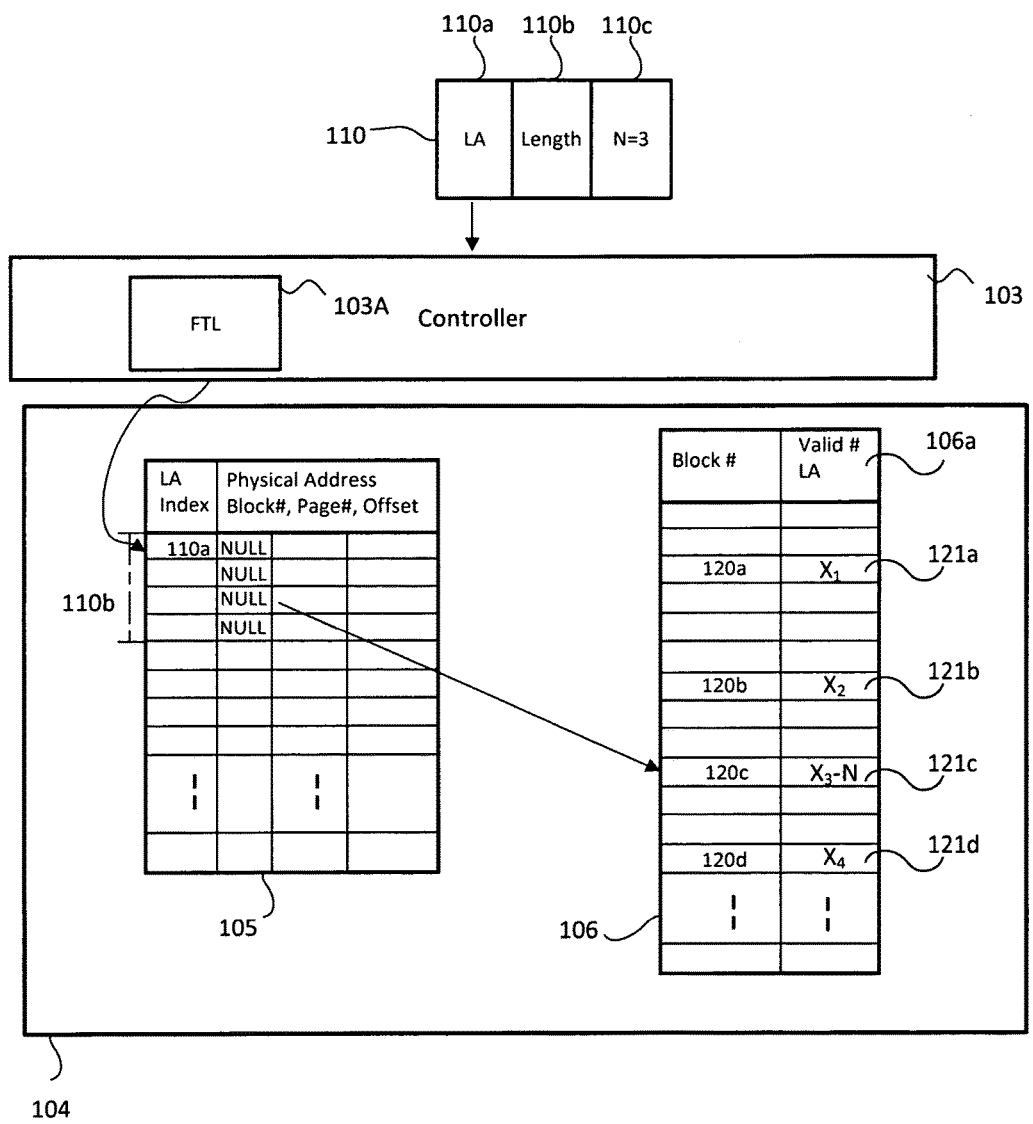

FIGS. 4A-4C illustrate an embodiment of the present invention during execution of a data invalidation command by a controller 103 of the present disclosure. For ease of illustration, only certain elements of the storage system 10 are shown. In FIG. 4A, the controller 103 executes the TRIM command 110a where the value N of the execution parameter 110c is set to "1." The controller 103 first invalidates the entries corresponding to the range of logical addresses in the lookup table 105 as indicated by the logical address 110a and the length parameter 110b. Next, because the execution parameter 110c is "1," the controller 103 will access every entry in the block metadata table 106, and updates each corresponding entry 121a-121d in the count value 106a accordingly. Updating the corresponding count value 106a for block numbers 120a-120d results in decreasing the value of each entry 121a-121d by the value of N, or "1".

FIG. 4B illustrates the execution by the controller 103 of the TRIM command 110a when the value N of the execution parameter 110c is set to "2." The controller 103 first invalidates the entries corresponding to the range of logical addresses in the lookup table 105 as indicated by the logical address 110a and the length parameter 110b. Next, because the execution parameter 110c is "2," the controller 103 will access every $2^{nd}$ entry in the block metadata table 106, and decrements each corresponding entry 121b and 121d in the count value 106a by N, or "2". Entries 120a, 120c and corresponding values 121a, 121c are not accessed or decremented. Setting the execution parameter 110c to "2" rather than "1" effectively reduces by half the total number of entries in the count value 106a that that the controller 103 updates as part of processing the TRIM command 110.

FIG. 4C illustrates the execution by the controller 103 of the TRIM command 110a when the value N of the execution parameter 110c is set to "3." The controller 103 first invalidates the entries corresponding to the range of logical addresses in the lookup table 105 as indicated by the logical address 110a and the length parameter 110b. Next, because the execution parameter 110c is "3," the controller 103 will access every $3^{rd}$ entry in the block metadata table 106, and decrements the corresponding entry 121c in the count value 106a by N, or "3". Setting the execution parameter 110c to "3" instead of "1" effectively reduces by a third the total number of count values 106a that the controller 103 needs to update.

Figure 5:
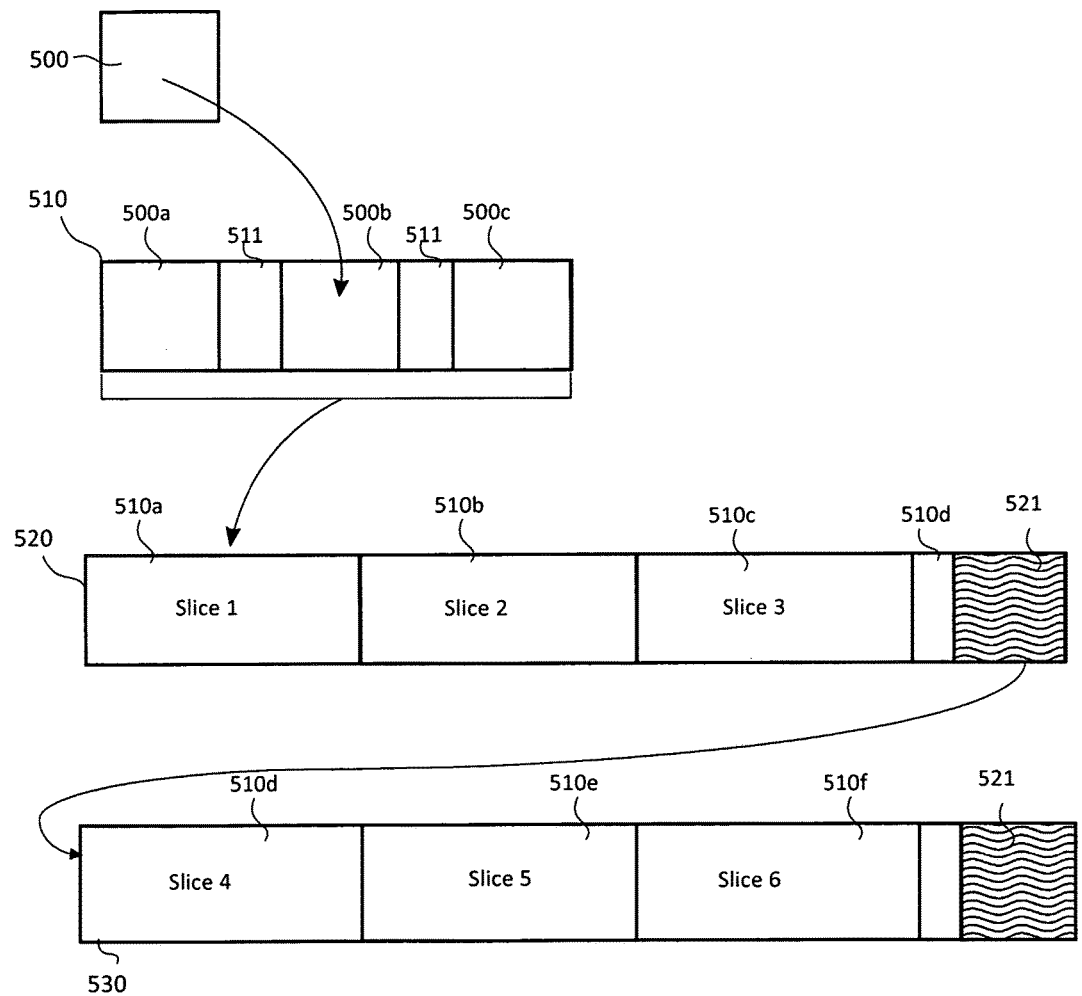
FIG. 5 illustrates the relationship between different logical addresses according to one embodiment of the present disclosure.

FIGS. 3 and 4A-4C discussed the present invention with logical addresses implemented as LBAs only. However, other implementations of logical addresses are within the scope of the invention. For example, FIG. 5 illustrates the relationship between an LBA 500, a slice 510, and pages 520 and 530 in storage media 107 according to another embodiment of the invention. Other sizes and implementations of the LBAs, slices, and pages are possible and within the scope of the present invention. As discussed above, LBA 500 refers to a block of data of some fixed size, e.g., 512 bytes or 4K bytes. Slice 510 comprises multiple LBAs 500a-500c and additional room 511 for headers/metadata and parity bits.

Pages 520 and 530 may comprise multiple slices. In this embodiment, page 520 comprises three complete slices 510a-510c. Page 520 also comprises a fixed space, known as the spare area 521, which is dedicated to Error Correction Code or parity bits and other metadata. Because of the spare area 521, an integer number of slices may not fit into a page, and portions of slices are allocated to the end of one page, with the remaining portion allocated to the next page. In this embodiment, a first portion of slice 510d is allocated to page 520 and a second portion of slice 510d is allocated to page 530. Page 530 also comprises complete slices 510e and 510f and spare area 521.

Other implementations of the storage media 107 are also possible. For example, multiple blocks may be grouped together to form a superblock; in some memory systems, especially for storage systems with substantially large storage capacities (e.g., above 1 TB), the superblock may represent the smallest unit of erasure.

Figure 6:
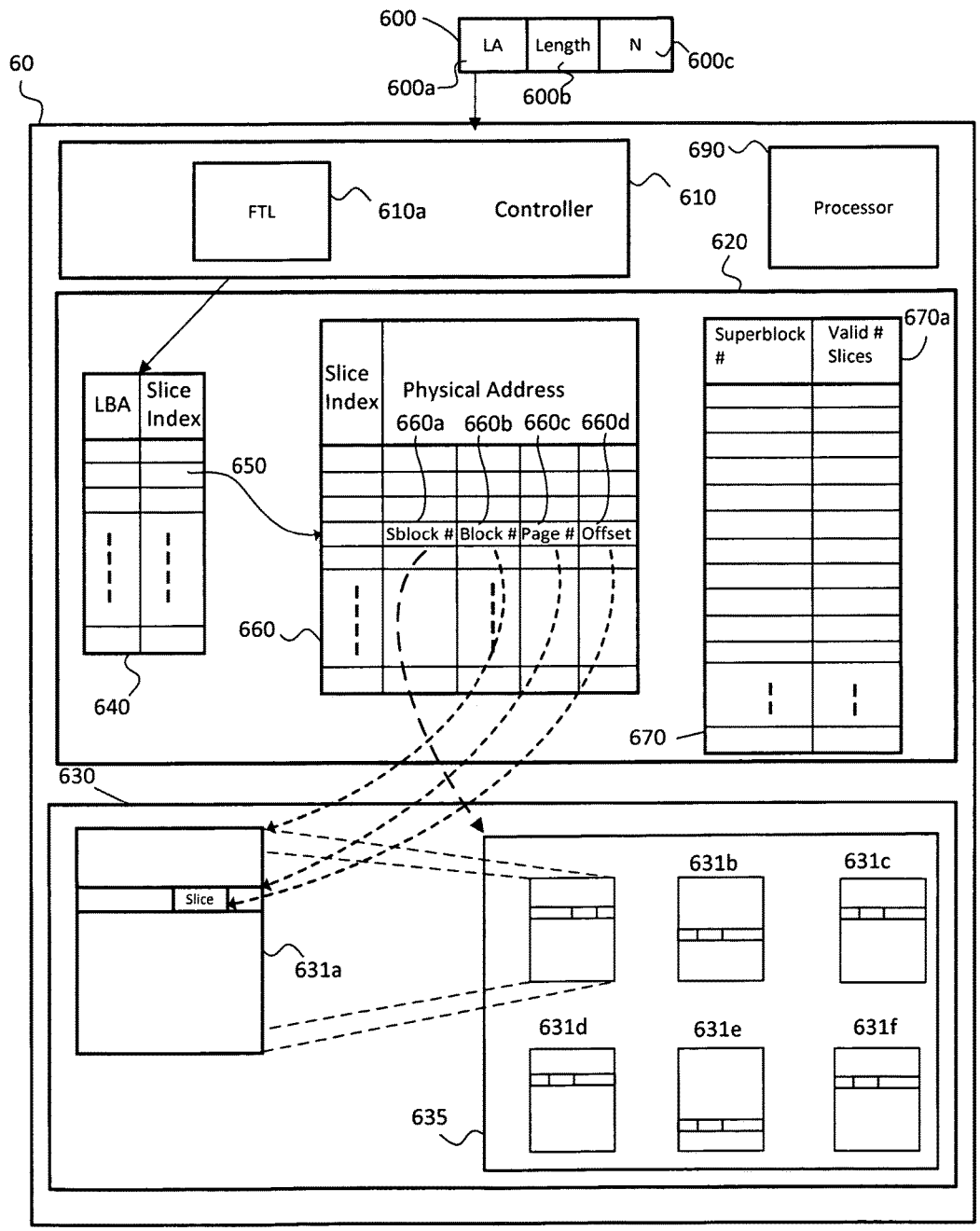
FIG. 6 illustrates a storage device according to another embodiment of the present disclosure.

FIG. 6 illustrates how a data invalidation command, e.g., TRIM command 600, is processed by a storage device 60 according to another embodiment of the present disclosure, when the storage device 60 implements functionality related to LBA-slices and superblocks as discussed above. Storage device 60 comprises a controller 610, DRAM 620, and storage media 630. For ease of illustration, an operating system that sends trim command 600 is not shown. Controller 610 comprises flash translation layer 610a. In this embodiment, the storage media 630 may be flash memory.

The controller 610 receives the TRIM command 600 comprising an LBA 600a, a length parameter 600b, and an execution parameter 600c. The controller 610 utilizes LBA 600a and the length parameter 600b to determine the range of logical block addresses affected by the TRIM command 600. Because storage device 60 implements LBA-slice functionality, the controller 610 employs a slice lookup table 640 in order to determine the correspondence between slice indexes 650 and the LBAs affected by the TRIM command 600. For each address within the range defined by the TRIM command 600, the slice lookup table 640 provides a slice index 650, which is used to index into a slice to physical address lookup table 660. A physical address may comprise a superblock number 660a, a block number 660b, a page number within the block 660c, and the offset of the slice within the page 660d. Other implementations of the physical address are possible. For example, a physical address may not need to include the superblock number 660a.

Superblock number 660a points to a superblock 635 within the storage media 630. Only one superblock 635 is shown in the figure for ease of illustration but one of ordinary skill in the art would understand that storage media 630 would contain many more superblocks. Block number 660b points to a physical block 631a within the storage media 630 where the physical block 631a is part of superblock 635. Associated with each superblock within storage media 630 is a superblock metadata table 670, which includes a count value 670a corresponding to each superblock. Superblock metadata table 670 may be stored in DRAM 620. Count value 670a tracks the number of valid slices in each superblock within storage media 630. For example, as shown in FIG. 6A, count value 670a tracks the number of valid slices contained within the pages 660c of each block 631a-631f in the superblock 635. As will be discussed later with respect to FIGS. 9A-9C, the controller 610 reduces the value of each entry of the count value 670a for each superblock by the value of N.

Figure 7:
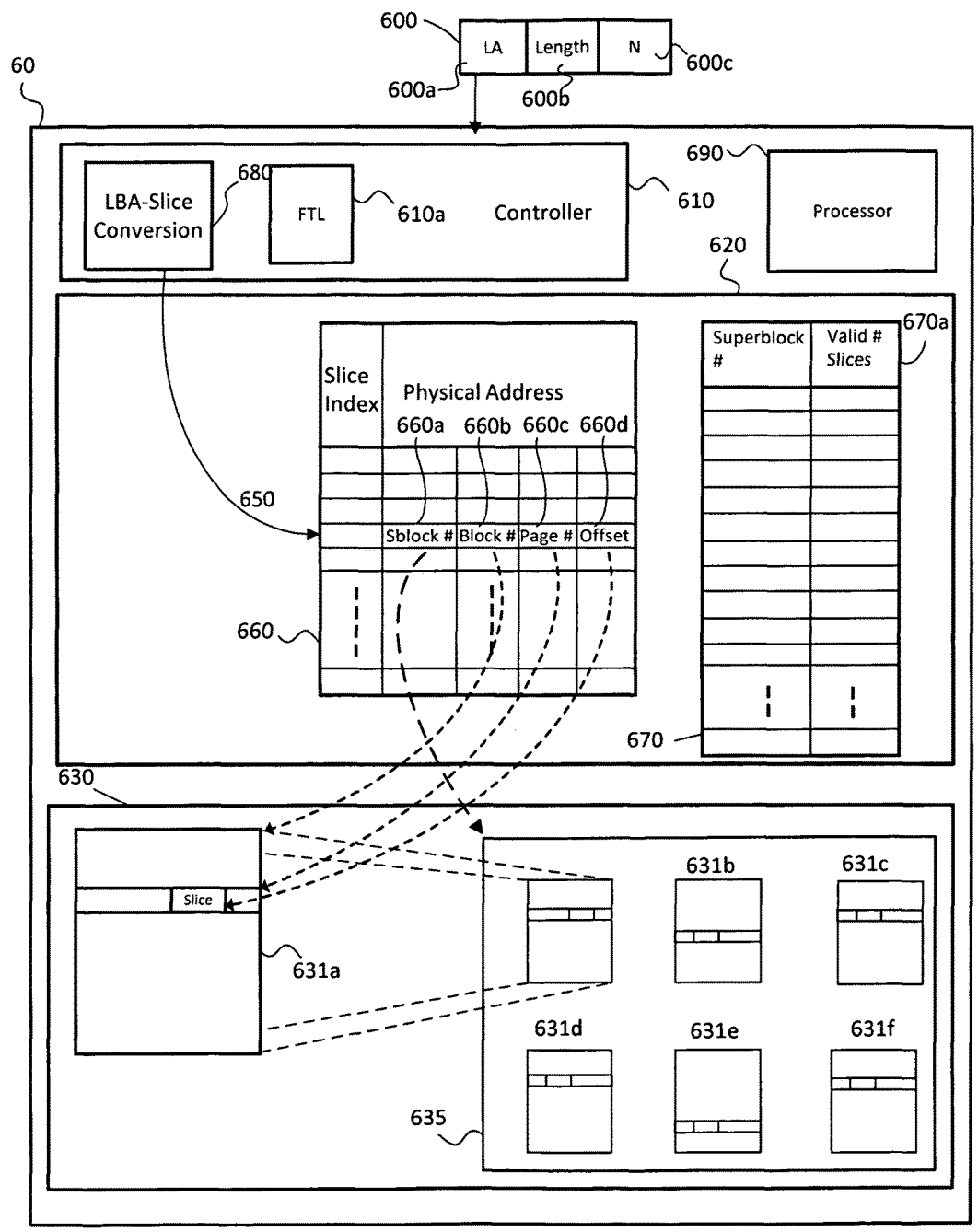
FIG. 7 illustrates a storage device according to another embodiment of the present disclosure.

FIG. 7 shows the storage device 60 according to an alternative embodiment of the present disclosure. For ease of illustration, an operating system that sends trim command 600 is not shown. Instead of a slice lookup table 640 as described in FIG. 6, the controller 610 may utilize a LBA-slice conversion function 680 to convert between an LBA 110a and its corresponding slice 610. In this case, the controller 610 indicates that entries have been invalidated by nullifying the respective entry in the slice to physical address lookup table 660 (instead of in the slice lookup table 640 as was described with respect to FIG. 6).

The LBA-slice conversion function 680 allows the controller 610 to calculate dynamically the value of the slice indices 650 that indexes into slice to physical address lookup table 660. The value of the slice indices 650 corresponds to the range of LBAs defined by TRIM command 600. In this embodiment, the LBA-slice conversion function 680 divides the value of LBA 110a by an integer V to determine the slice index 650. Integer V is calculated by determining the number of LBAs within a slice. For example, if a slice has a size of 4 kilobytes and LBA 110a refers to an LBA having a size of 512 bytes, then the slice comprises 8 LBAs. The conversion function 680 will divide the value of LBA 110a by 8 to determine the slice index 650. Any remainder provides the offset 660d within the slice.

Figure 8:
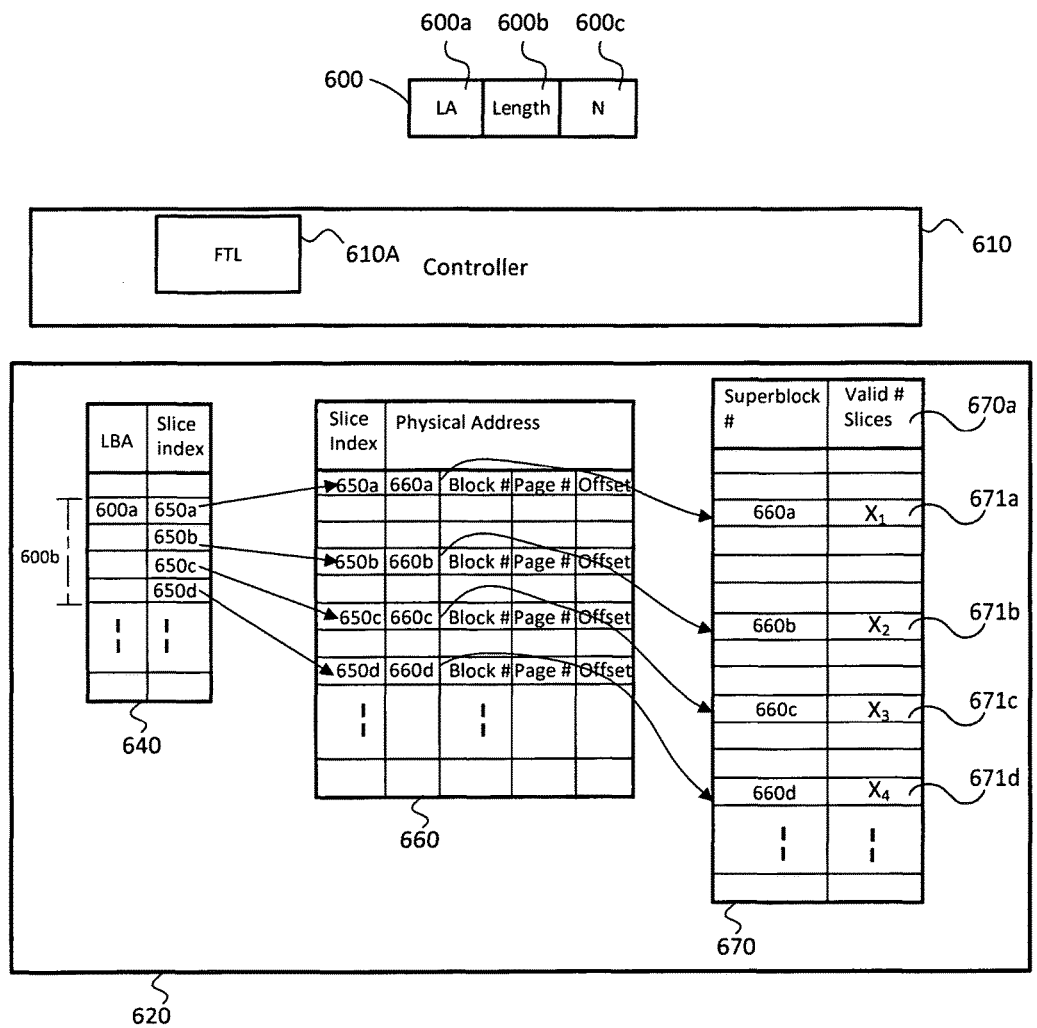
FIG. 8 illustrates a storage device according to another embodiment of the present disclosure.

FIG. 8 illustrates an embodiment of the present invention prior to execution of the TRIM command 600. For ease of illustration, only certain elements of the storage device 60 are shown. As shown in FIG. 8, a set of contiguous LBAs in the slice lookup table 640 does not necessarily result in a corresponding set of contiguous slice indices 650a-650d in the slice to physical address lookup table 660. Moreover, each slice corresponding to the slice indices 650a-650d may be stored in different superblocks as indicated by the different superblock numbers 660a-660d. The superblock numbers 660a-660d are also used to locate the entries in the superblock metadata table 670. Superblock metadata table 670 comprises a count value 670a, which tracks the number of valid slices within each superblock. In this embodiment, superblock number 660a has $X_1$ valid slices, superblock number 660b has $X_2$ valid slices, superblock number 660c has $X_3$ valid slices, and superblock number 660d has $X_4$ valid slices. The values $X_1$-$X_4$ stored in the count value 670a indicate the number of slices in each superblock that contain valid data (i.e., that have not been previously deleted).

Figure 9A:
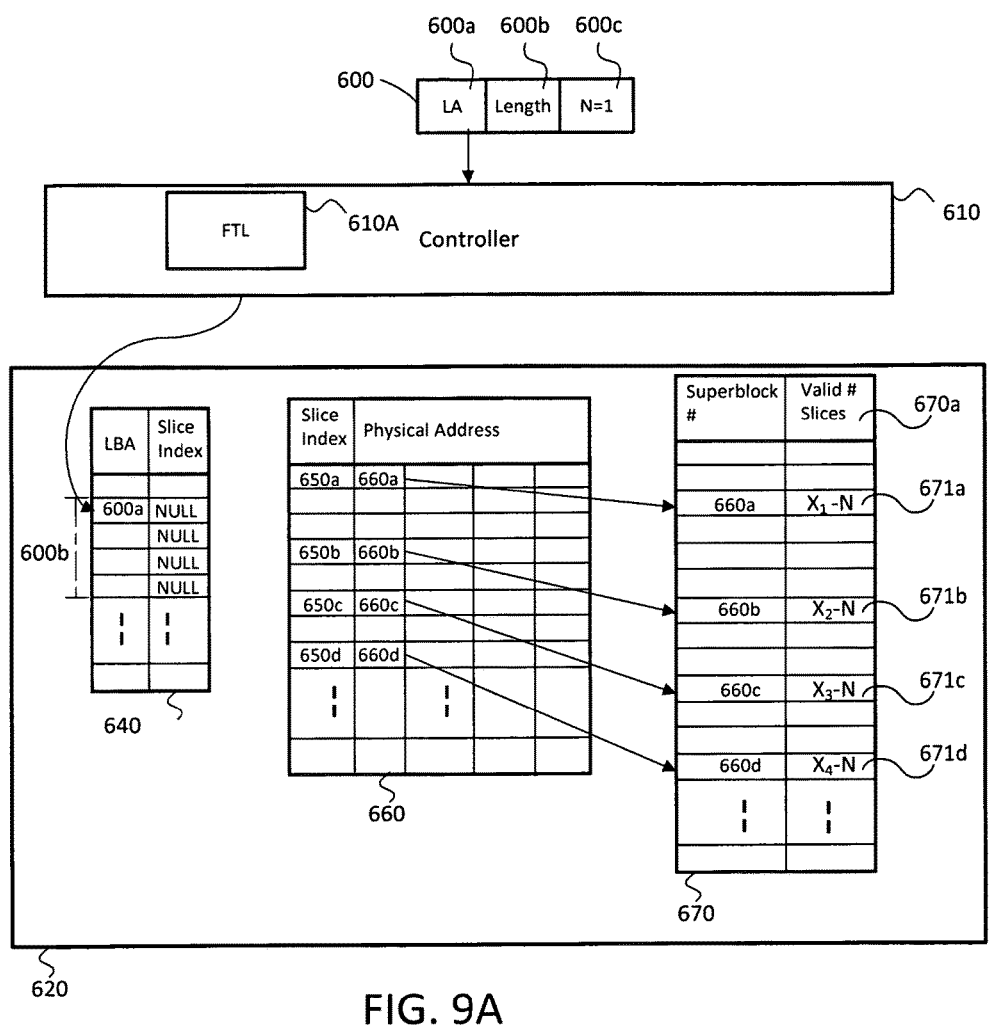
FIGS. 9A-9C illustrates a storage device during execution of a data invalidation command with different parameters according to another embodiment of the present disclosure.
Figure 9B:
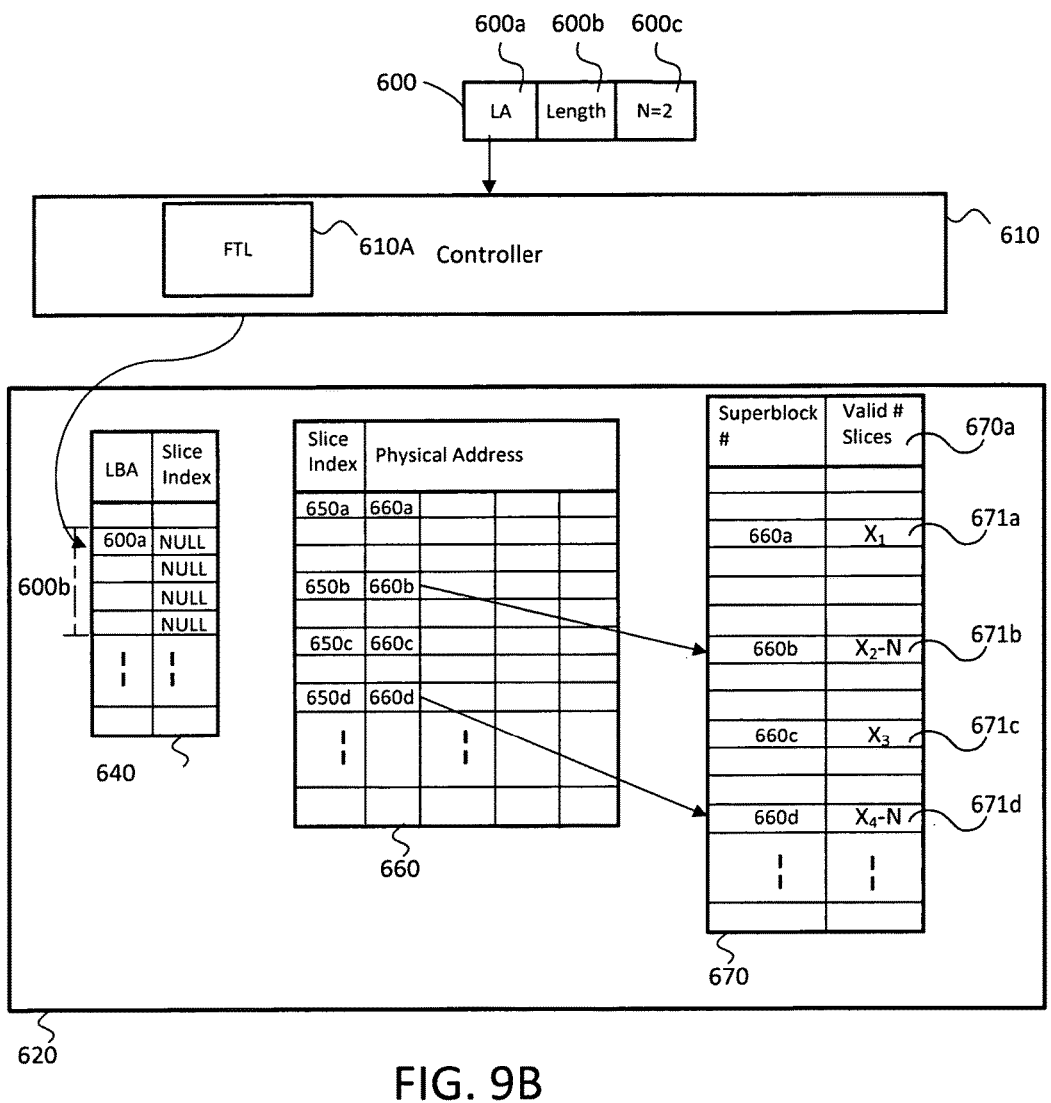
Figure 9C:
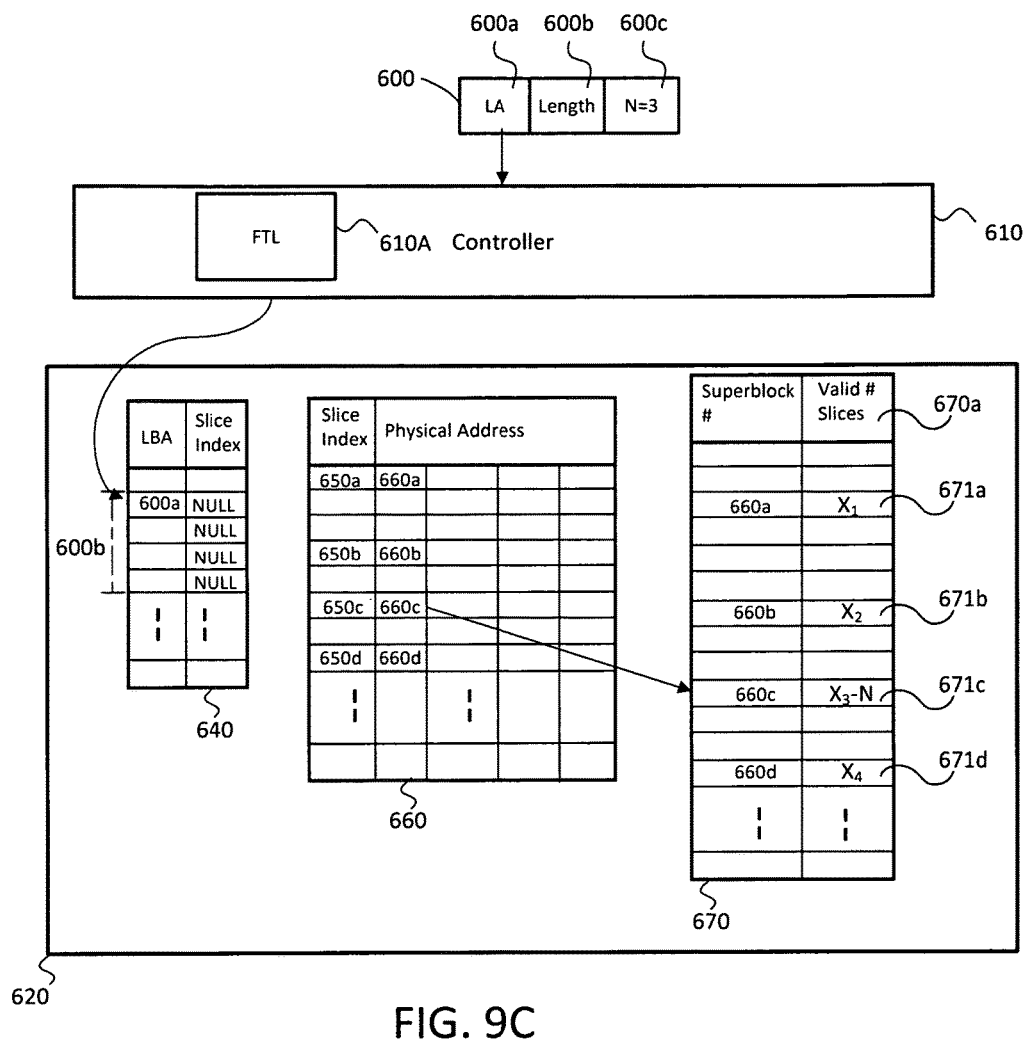
Figure 10:
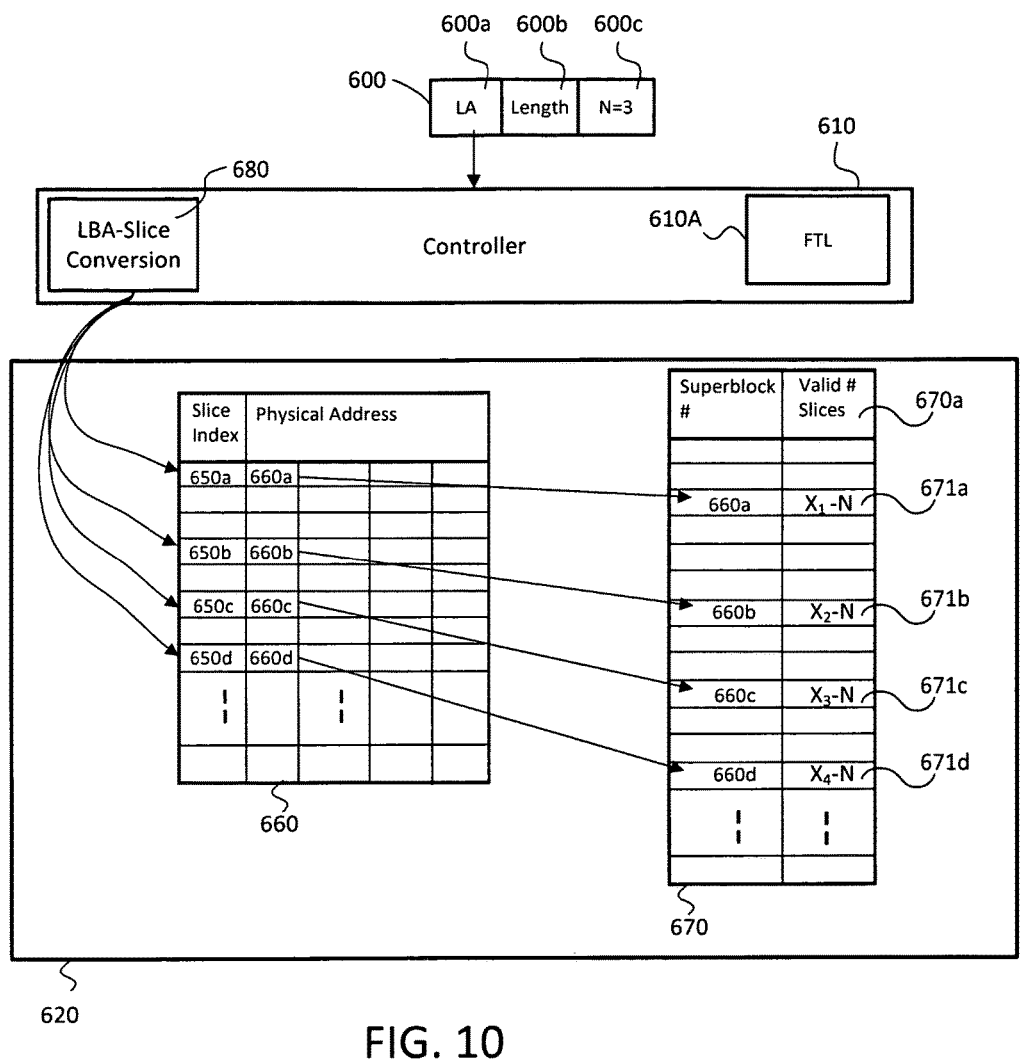
FIG. 10 illustrates a storage device during execution of a data invalidation command according to another embodiment of the present disclosure.

FIGS. 9A-9C illustrate an embodiment of the present invention with regard to the execution of the TRIM command 600 by the controller 610, based on different values of the execution parameter 600c. For ease of illustration, only certain elements of the storage device 60 are shown. FIGS. 9A-9C illustrate embodiments employing a slice lookup table 640. FIG. 10, which is discussed later, illustrates an embodiment employing a LBA-slice conversion function 680. One of ordinary skill in the art would understand that the number of entries in each table could be substantially larger than the amount shown in the figures and would be within the scope of the invention.

FIG. 9A illustrates execution by the controller 610 when the execution parameter 600c is set to "1." The controller 610 first invalidates (e.g., sets to NULL) entries in the slice lookup table 640 corresponding to a range of LBAs defined by the TRIM command 600. An invalidated entry for an LBA indicates that there is no valid slice associated with that LBA. In this simplified embodiment, there are four impacted LBAs within a contiguous range of LBAs as defined by LBA 600*a* and the length parameter 600*b*.

Next, in count value 670*a* of the superblock metadata table 670, the controller 610 decrements the entries 671*a*-671*d* corresponding to the superblocks in which the slices (as indicated by slice indices 650*a*-650*d*) are located. The controller 610 locates entries 671*a*-671*d* in the count value 670*a* by determining the physical address corresponding to the slice indices 650*a*-650*d* in the slice to physical address lookup table 660. In this embodiment, the physical addresses comprise superblock numbers 660*a*-660*d* that correspond to slice indices 650*a*-650*d*. Using the superblock numbers 660*a*-660*d*, the controller 610 decrements the value of the corresponding entries 671*a*-671*d* in count value 670*a* by the value of N, or "1." Because the value of the execution parameter is determined to be "1," every entry 671*a*-671*d* in count value 670*a* is updated.

FIG. 9B illustrates execution of the TRIM command 600 by the controller 610 when the execution parameter 600*c* is set to "2." As before, the controller 610 first invalidates entries in the slice lookup table 640 for the range of LBAs defined by the TRIM command 600. Next, the controller 610 accesses every $2^{nd}$ entry in the slice to physical address lookup table 660 to derive the respective superblock numbers 660*b* and 660*d* used for locating the corresponding entries for the count value 670*a*. In this manner, the controller 610 only decrements entries 671*b* and 671*d*, or half the entries that were decremented when the execution parameter was set to "1." The controller 610 decrements entries 671*b* and 671*d* of the count value 670*a* by the value of N, or "2."

FIG. 9C illustrates execution of the TRIM command 600 by the controller 610 when the execution parameter 600*c* is set to "3." As before, the controller 610 first invalidates entries in the slice lookup table 640 for the range of LBAs defined by the TRIM command 600. Next, the controller 610 accesses every $3^{rd}$ entry in the slice to physical address lookup table 660 to derive the superblock number that is used for locating the corresponding entries for the count value 670*a*. In this manner, the controller 610 only decrements entry 671*c*, or a third of the entries that were decremented when the execution parameter was set to "1." or half the entries that were decremented when the execution parameter was set to "1." The controller 610 decrements entry 671*c* by the value of N, or "3."

The examples discussed in FIGS. 9A-9C are merely exemplary and do not limit the invention. Other values for the execution parameter 600*c* are possible and are within the scope of the invention.

FIG. 10 shows an alternative embodiment where the LBA-slice conversion 680 replaces the slice lookup table 640 and the execution parameter is set to "1." In this case, the controller 610 indicates that entries have been invalidated by nullifying the respective entry in the slice to physical address lookup table 660. The controller 610 performs the same functions as described in FIG. 9A.

The present disclosure provides an improved storage device for executing data invalidation commands. The improved storage device can speed execution of data invalidation commands, especially those that can impact a range of logical addresses that include thousands or even millions of entries. Decrementing count values for impacted blocks or superblocks by the value of the execution parameter, or "N" makes execution of the TRIM command by the storage device approximately N times faster. Approximation of the count values in this manner operates on an assumption that accesses to logical addresses within the same locality (e.g., within a lookup table) will also be physically located in the same superblock. Therefore, if groups of N LBAs are likely to be located physically in the same flash memory superblock, the number of valid LBAs in a superblock can be approximated with some accuracy by updating every Nth LBA by N rather than actually accessing and decrementing each and every logical address.

Figure 11:
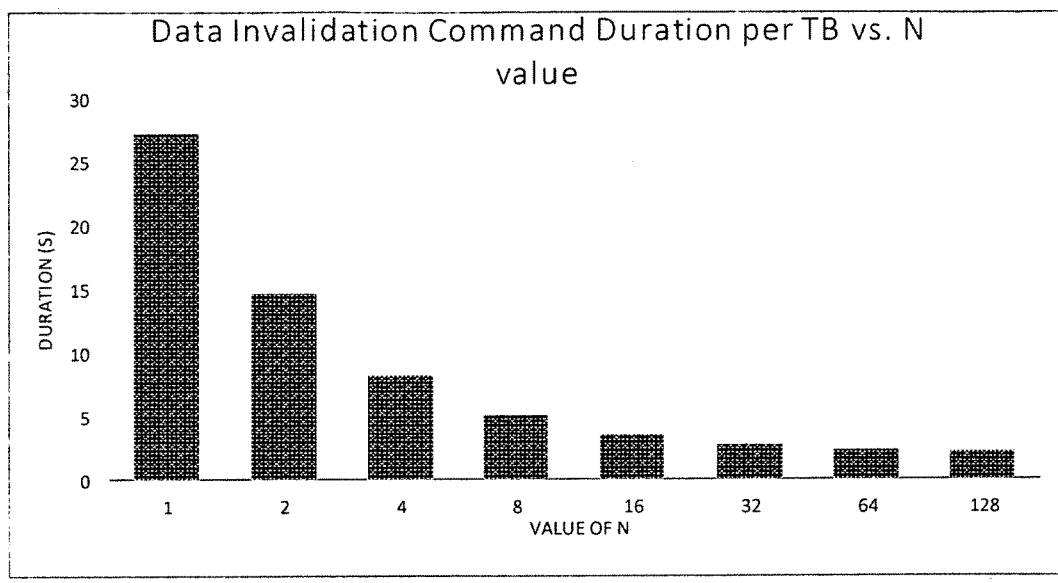
FIG. 11 is a graph showing the improved operation of a storage device according to an embodiment of the present disclosure.

In one example, the improved storage device accelerates execution of data invalidation commands when N is greater than 1 by as much as 40 to 90% faster than conventional controllers executing conventional data invalidation commands. FIG. 11 shows the duration times for executing a data invalidation command on a 1 Terabyte (TB) of data on an SSD (of greater than 1 TB in size) for different values of the execution parameter. As can be seen, there are significant improvements in the execution of the invalidation command as N increases. When N=1, the execution of the invalidation command takes approximately 27 seconds. The execution time is reduced by nearly half to 15 seconds when N=2 and by nearly half again (or a nearly a quarter of the time when N=1) to 8 seconds when N=4. Thus, execution of the storage device and its controller is significantly improved.

Other objects, advantages and embodiments of the various aspects of the present disclosure will be apparent to those who are skilled in the field of the invention and are within the scope of the description and the accompanying Figures. For example, but without limitation, structural or functional elements might be rearranged consistent with the present disclosure. Similarly, principles according to the present invention could be applied to other examples or configurations of the storage device, which, even if not specifically described here in detail, would nevertheless be within the scope of the present invention.

What is claimed is:

1. A non-volatile data storage device in communication with a host device, comprising:
   a memory device having physical storage locations;
   a cache memory configured to store a count value for each of the physical storage locations of the memory device and a map table having a plurality of entries associated with an address range $A_1$ to $A_x$ where a value of x is greater than 1; and
   a controller configured to be responsive to a data invalidation request received from the host device which invalidates the address range $A_1$ to $A_x$ by invalidating a subset of the plurality of entries associated with the address range $A_1$ to $A_x$, and decrementing a count value for the subset of the plurality of entries, wherein the subset of the plurality of entries comprises a number of entries less than the value of x.

2. The non-volatile data storage device of claim 1, wherein the controller is further configured to determine an integer value N based on information in the data invalidation request, wherein N is greater than 1.

3. The non-volatile data storage device of claim 2, wherein the controller is further configured to read every Nth entry of the plurality of entries.

4. The non-volatile data storage device of claim 2, wherein the controller is further configured to decrement the count value for the subset of the plurality of entries by decrementing the count value of every Nth entry of the plurality of entries.

5. The non-volatile data storage device of claim 2, wherein the controller is further configured to decrement the count value for the subset of the plurality of entries by decrementing, by the integer value N, the count value of every Nth entry of the plurality of entries.

6. The non-volatile data storage device of claim 2, wherein the information includes a parameter specifying the value of x and wherein the controller is further configured to determine the integer value N based on the parameter.

7. The non-volatile data storage device of claim 6, wherein the controller is further configured to assign a first value to the integer value N if the value of x falls within a first band of values.

8. The non-volatile data storage device of claim 7, wherein the controller is further configured to assign the integer value N a second value if the value of x falls within a second band of values.

9. The non-volatile data storage device of claim 2, wherein the information includes an execution parameter specifying the integer value N.

10. The non-volatile data storage device of claim 2, further comprising:
wherein the controller is further configured to determine the integer value N based on a current usage of a processor of the non-volatile data storage device.

11. The non-volatile data storage device of claim 10, further comprising:
wherein the controller is further configured to assign a first value to the integer value N if the current usage of the processor falls within a first band of usage values that is defined by a first and second threshold value.

12. The non-volatile data storage device of claim 2, wherein the information includes a parameter specifying a maximum completion time for the execution of the data invalidation request.

13. The non-volatile data storage device of claim 12, wherein the controller is further configured to calculate the number of entries in the subset of the plurality of entries based on the maximum completion time.

14. A method for executing a data invalidation command by a storage device, comprising:
receiving a data invalidation request;
responsive to the data invalidation request which invalidates an address range $A_1$ to $A_x$, invalidating a subset of a plurality of entries in a map table based on the address range $A_1$ to $A_x$ where a value of x is greater than 1; and
decrementing a count value for the subset of the plurality of entries, wherein the subset of the plurality of entries comprises a number of entries less than the value of x.

15. The method of claim 14, further comprising
calculating an integer value N based on information in the data invalidation request, the integer value N being less than the value of x and greater than 1.

16. The method of claim 15, further comprising reading every Nth entry of the plurality of entries.

17. The method of claim 15, wherein decrementing the count value for the subset of the plurality of entries comprises decrementing the count value of every Nth entry of the plurality of entries.

18. The method of claim 15, wherein decrementing the count value for the subset of the plurality of entries comprises decrementing the count value of every Nth entry of the plurality of entries by the integer value N.

19. The method of claim 15, wherein the information includes a parameter specifying the value of x and further comprising calculating the integer value N based on the parameter.

20. The method of claim 19, further comprising assigning a first value to the integer value N if the value of x falls within a first band of values.

21. The method of claim 20, further comprising assigning a second value to the integer value N if the value of x falls within a second band of usage values.

22. The method of claim 15, wherein the information includes an execution parameter specifying the value of N.

23. The method of claim 15, further comprising determining the integer value N based on a current usage of a processor of the storage device.

24. The method of claim 23, further comprising assigning a first value to the integer value N if the current usage of the processor falls within a first band of usage values.

25. The method of claim 15, wherein the information includes a parameter specifying a maximum completion time for execution of the data invalidation request.

26. The method of claim 25, further comprising calculating the number of entries in the subset of the plurality of entries based on the maximum completion time.

* * * * *